United States Patent [19]

Kishida

[11] Patent Number: 4,488,519
[45] Date of Patent: Dec. 18, 1984

[54] INTAKE SYSTEM FOR FOUR-CYCLE ENGINES

[75] Inventor: Hajime Kishida, Hamamatsu, Japan

[73] Assignee: Yamaha Hatsudoki Kabushiki Kaishi, Iwata, Japan

[21] Appl. No.: 377,965

[22] Filed: May 13, 1982

[30] Foreign Application Priority Data

May 15, 1981 [JP] Japan .................................. 56-73278

[51] Int. Cl.³ .......................... F02B 29/00; F02B 31/00
[52] U.S. Cl. .................................. 123/52 M; 123/306; 123/73 A; 123/52 MF
[58] Field of Search ............... 123/52 MB, 52 M, 306, 123/308, 309, 310, 73 A, 52 MF

[56] References Cited

U.S. PATENT DOCUMENTS

| | | | |
|---|---|---|---|
| 3,687,118 | 8/1972 | Nomura | 123/73 A |
| 4,240,387 | 12/1980 | Motosugi et al. | 123/52 MB |
| 4,356,798 | 11/1982 | Sakaoka et al. | 123/52 MF |

FOREIGN PATENT DOCUMENTS

2058906  4/1981  United Kingdom ................ 123/308

Primary Examiner—Craig R. Feinberg
Assistant Examiner—David A. Okonsky
Attorney, Agent, or Firm—Ernest A. Beutler

[57] ABSTRACT

An induction system for a four-cycle internal combustion engine that improves charging efficiency, power and torque at idle and low speed. A check valve is provided in the intake passage for precluding reverse flow under these running conditions. In addition, a plenum chamber is provided that communicates with the intake passage downstream of the check valve for improving power and torque throughout the entire load and speed range of the engine.

7 Claims, 2 Drawing Figures

INTAKE SYSTEM FOR FOUR-CYCLE ENGINES

BACKGROUND OF THE INVENTION

This invention relates to an intake system for four-cycle engines and more particularly to an improved induction system that offers significantly better low and mid-range performance than prior art systems.

As is well known, engines and particularly those operating on the four-cycle principle normally have at least some overlap in their valve timing. That is, it is a common practice to effect opening of the intake valve while the piston is still undergoing the exhaust stroke. This is done to insure good charging efficiency at high speeds. During high speed running, there is a flow inertia in the intake charge that is sufficient to prevent any exhaust gases from being expelled from the chamber into the intake system. At lower speeds, however, there is some backflow into the intake passage which reduces charging efficiency. Although the problem may be obviated by employing valve timing with no overlap, high speed performance and maximum power output are severely restricted if this is done.

It has been proposed to avoid the backflow of exhaust gases into the intake system, even though a large valve overlap may be employed, by providing a check valve in the intake passage slightly upstream of the intake port. The use of a check valve in this location, normally a reed-type valve, will improve low speed and mid-range running. However, the use of a such a check valve provides a resistance in the flow passage that can reduce maximum power output.

It is, therefore, a principal object of this invention to provide an intake system for an engine that improves low speed torque and power output without substantially affecting maximum power output.

It is another object of this invention to prove an induction system for an engine that provides improved performance at the low and mid-ranges without significantly restricting maximum output.

SUMMARY OF THE INVENTION

This invention is adapted to be embodied in an internal combustion engine having a chamber, an intake passage for delivering a charge to the chamber and check valve means in the intake passage upstream of the chamber for precluding reverse flow from the chamber through the intake passage. In accordance with the invention, a plenum chamber is provided that communicates with the intake passage downstream of the check valve.

DETAILED DESCRIPTION OF THE PREFERRED EMBODIMENT

Figure 1:
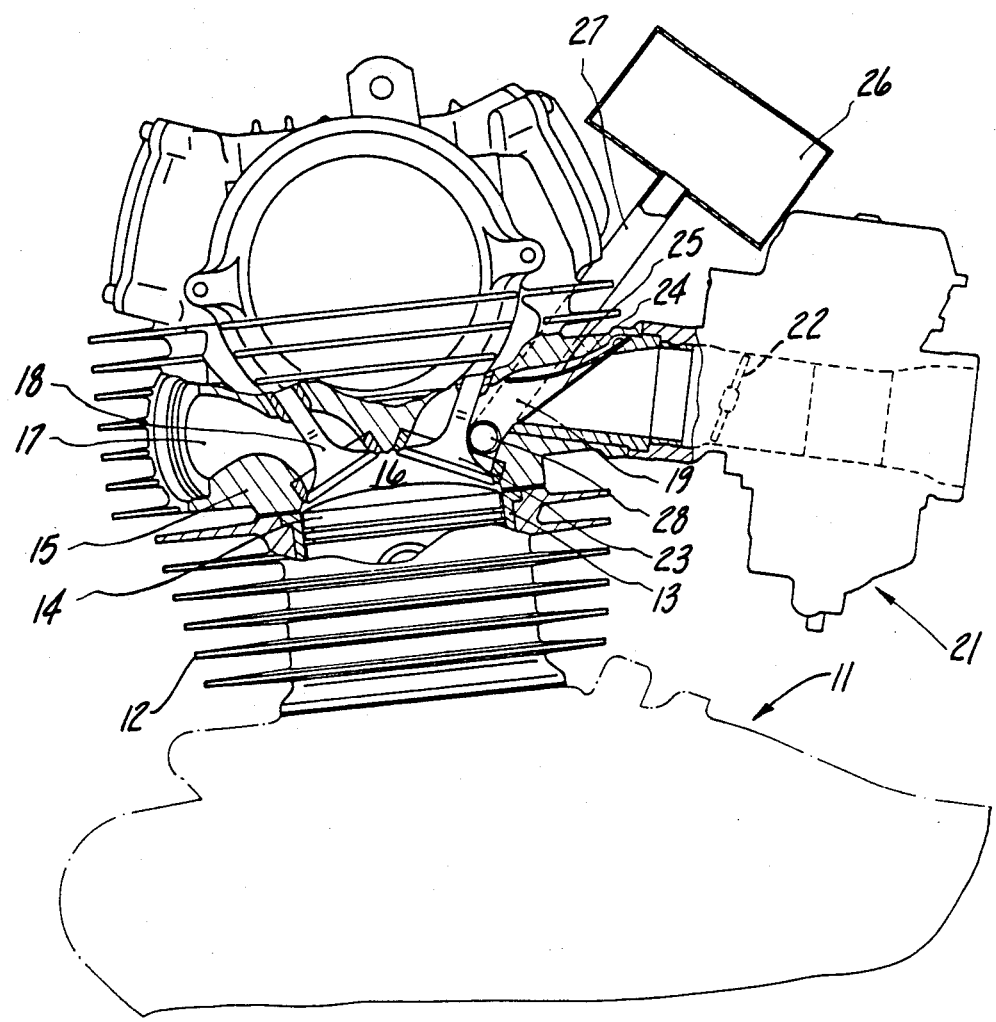
FIG. 1 is a side elevational view of an internal combustion engine embodying this invention, with a portion broken away and another portion shown in phantom.

In the drawings, the reference numeral 11 indicates generally an internal combustion engine in accordance with the invention. The engine 11 may be of any chamber number or chamber configuration and since the invention relates to the induction system, only a single cylinder has been illustrated and will be described. The application of the invention to multi-chamber engines is believed to be apparent to those skilled in the art from the following description.

The engine 11 includes a cylinder block 12 in which a cylinder liner 13 is fitted. The cylinder liner 13 defines a cylinder bore in which a piston 14 is supported for reciprocation in a known manner. The piston 14 is coupled to a crankshaft (not shown) in a known manner by means of a connecting rod which also is not shown.

A cylinder head 15 is affixed to the cylinder block 12 in a known manner. The cylinder head has a recess or cavity 16 that cooperates with the piston 14 and cylinder bore of the liner 13 to define a chamber of variable volume. The recess 16 will, at times, be referred to as the combustion chamber.

An exhaust passage 17 extends through one side of the cylinder head 15 from the recess 16. An exhaust valve 18, which is operated in any suitable manner such as by a single overhead camshaft (not shown) controls the communication of the chamber 16 with the exhaust passage 17.

An intake passage 19 extends through the opposite side of the cylinder head 15. A carburetor indicated generally by the reference numeral 21 communicates with the intake passage 19 for delivering a fuel/air mixture to the cylinder head intake passage 19. The carburetor 21 includes a throttle valve 22 for controlling the amount of flow. An intake valve 23 is positioned at the end of the intake passage 19 for controlling the flow of intake charge into the combustion chamber 16. The intake valve 23 is operated also in a known manner from the aforementioned single overhead camshaft.

The timing of the opening and closing of the intake valve 23 is designed so that the intake valve 23 commences to open before the piston 14 has reached top dead center on its exhaust stroke. As has been noted, this is done so as to insure good charging efficiency and volumetric efficiency at wide open throttle. However, at idle and low speeds, this early opening of the intake valve 23 can cause combustion products to be delivered back through the open intake valve 23 into the intake passage 19. A reed-type check valve 24 is provided in the intake passage 19 adjacent the intake valve 23 and downstream of the carburetor throttle valve 22. The reed-type check valve 24 cooperates with a valve stopper plate 25 so that its maximum degree of opening is controlled by this contact. At such time as the pressure in the intake passage 19 downstream of the check valve 24 exceeds upstream pressure and any pre-load which may be exerted on the valve 24, the valve 24 will close and preclude reverse flow through the intake passage. In this manner, the backflow of exhaust gases at idle and low speeds is precluded and performance may be substantially improved.

Figure 2:
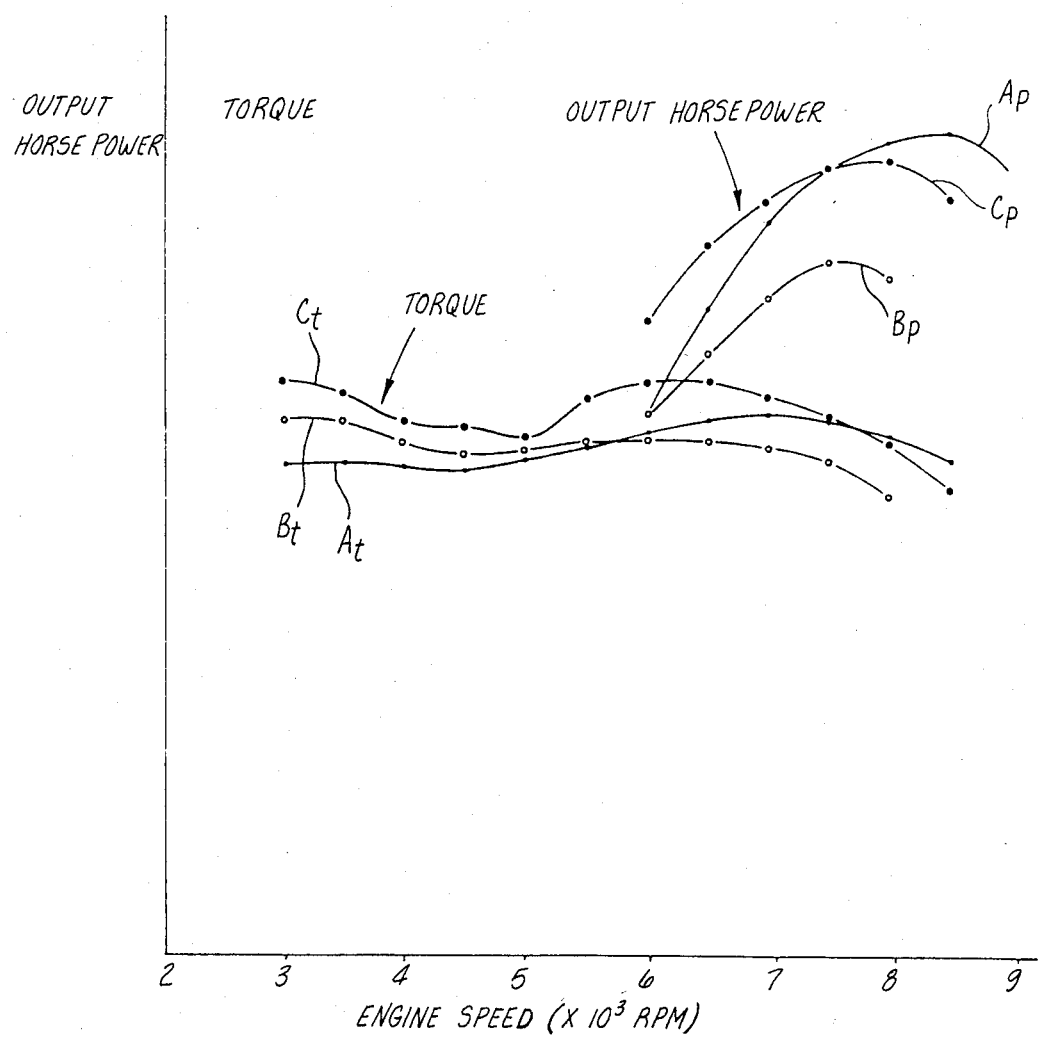
FIG. 2 is a graph showing the engine speed versus power and torque to explain the advantages of the invention.

FIG. 2 is a graphic analysis showing engine speed on the ordinate and power and torque on the abscissa. The curves $A_t$ and $A_p$ represent the torque and power curves respectively of an engine in which a check valve 24 is not incorporated. By employing the check valve, the low speed torque is significantly increased as shown by the curve $B_t$. However, as shown by both the torque curve $B_t$ and the power curve $B_p$, the use of the check valve 24 reduces both torque and power at higher engine speeds. This is because the check valve 24 provides resistance to flow which does decrease the volumetric efficiency at higher engine speeds.

In accordance with this invention, a plenum chamber 26 is provided that communicates through a relatively small pipe 27 having an inlet 28 that is disposed immediately adjacent the intake valve 23 and downstream of the reed-type check valve 24. Preferably, the capacity of the plenum chamber 26 and pipe 27 is approximately one-sixth of the volume of the intake passage 19 downstream of the check valve 24 when the check valve is in its closed position. The provision of a plenum chamber having communication with the intake passage between the check valve 24 and the intake valve 23 has been found to significantly improve the power of the engine and its torque throughout substantially the entire engine speed and load range. This is particularly true at lower engine speeds as shown by the torque and power curves $C_t$ and $C_p$ in FIG. 2 which represents the performance of the engine 11.

It is believed that the plenum chamber 26 and its connecting pipe 27 have the effect of dampening pulsations which are induced in the intake passage 19 by the operation of the check valve 24 and also to improve charging efficiency by promoting flow as soon as the intake valve 23 is opened and throughout the entire time when the valve is open. Thus, the volumetric efficiency can approach unity even though the reed-type check valve 24 is provided in the induction system. As can be seen from FIG. 2, the combination of the reed-type check valve 24 and the plenum chamber which communicates with the intake passage downstream of this valve provides maximum power output very close to that of a conventional engine while improving significantly low speed torque and power even above that of an engine embodying only a check valve. When the intake valve 23 closes, there will be a negative pressure existent in the plenum chamber 26 which tends to cause a continued flow through the induction passage and which will tend to prevent the reed-type check valve 24 from completely closing, particularly at higher speeds. Therefore, the power output at high speeds can be improved since each intake charge need not cause the initial opening of the reed-type check valve 24 during such running conditions.

Although the invention has been described in conjunction with the use of a reed-type check valve, it should be readily apparent that it may be used in conjunction with any other type of check valve serving the same function. That is, the reed-type check valve 24 may be replaced by any known type of check valve for precluding reverse flow through the intake passage 19. Various other changes and modifications may be made without departing from the spirit and scope of the invention as defined by the appended claims.

I claim:

1. In an internal combustion engine having a chamber, an intake passage for delivering a charge to said chamber, and check valve means in said intake passage upstream of said chamber for precluding reverse flow from said chamber through said intake passage, the improvement comprising means for promoting continued flow through said intake passage and retarding closure of said check valve means including a plenum chamber communicating with said intake passage downstream of said check valve means.

2. In an internal combustion engine as set forth in claim 1 further including an intake valve for controlling the communication of the intake passage with the chamber, the plenum chamber being in communication with the intake passage between the check valve means and said intake valve.

3. In an internal combustion engine as set forth in claim 2 wherein the check valve means comprises a reed-type check valve.

4. In an internal combustion engine as set forth in any one of claims 1 through 3 wherein the plenum chamber is in communication with the intake passage by means of a restricted passageway.

5. In an internal combustion engine as set forth in claim 4 wherein the restricted passageway comprises a pipe extending into the intake passage and juxtaposed to the chamber.

6. In an internal combustion engine as set forth in claim 5 wherein the volume of the plenum chamber and communicating passage is approximately one-sixth of the volume of the intake passage downstream of the check valve means when in its closed position and the point of communication of the intake passage with the chamber.

7. In an internal combustion engine as set forth in claim 6 wherein the engine is a four-stroke cycle engine.

* * * * *